United States Patent Office 3,023,195
Patented Feb. 27, 1962

3,023,195
PREVENTING SCORCH IN BUTYL RUBBER COMPOSITIONS
James G. Martin, Princeton, John L. Ernst, Westfield, Conrad J. Jankowski, Bayonne, and Alan A. Schetelich, Cranford, N.J., assignors to Esso Research and Engineering Company, a corporation of Delaware
No Drawing. Filed May 26, 1958, Ser. No. 737,476
12 Claims. (Cl. 260—79.5)

This invention relates to a method of preventing scorching in butyl rubber compositions.

Butyl rubber is a synthetic rubber distinguished from natural rubber and other synthetic rubbers in that it has a relatively low unsaturation, of about 1.0–50 iodine number (Wijs), compared to the relatively high unsaturation values of 200 to 400 for natural rubber, SBR (styrene-butadiene rubber), NBR (nitrile-butadiene rubber), neoprene, etc. On account of its low unsaturation, butyl rubber requires ultra accelerators in order to obtain satisfactory vulcanization, particularly within practical time limits, but the use of ultra accelerators tends to cause some scorching or pre-curing during the compounding and/or shaping (extrusion, etc.) steps prior to final vulcanization.

An object of the present invention is to prevent this scorching during compounding, but yet permit the use of amounts and types of curatives whcih will give a satisfactory and preferably rapid cure during the final vulcanization.

Broadly, the invention comprises the addition of a small amount of a non-accelerating copper-containing material with the butyl rubber, together with sulfur-containing curatives, and other optional compounding ingredients, so that the copper-containing material will prevent scorching during the mixing and shaping steps, which are carried out at a temperature below 290° F., e.g. at about 200–280° F., preferably 250 to 270° F., but will not interfere with complete, and preferably rapid vulcanization when subsequently heated to a temperature at least as high as 290° F. for the desired curing time, e.g, at about 300–450° F. inversely for about 2 hours to one minute, preferably about 310–400° F. inversely for about 1 hour to 5 minutes. Generally, it is preferred to effect a fast and tight cure under vulcanizing conditions corresponding to less than 20 minutes at 320° F.

The butyl rubber to be used, and the preparation thereof, are already well known in the art, as described in the Thomas and Sparks Patent 2,356,128, an article by Sparks et al. in Industrial and Engineering Chemistry, volume 32 (October 1940), page 1284, etc., and in a book "Synthetic Rubber" (1954) by Whitby, in chapter 24. Essentially, butyl rubber is a high molecular weight rubbery olefin-multiolefin copolymer having a Staudinger molecular weight of at least 15,000, preferably 20,000 to 100,000 or more, and a low unsaturation corresponding to a Wijs iodine number of 1.0 to 50. Preferably it is a copolymer of 85 to 99.5% of an isoolefin of 4 to 8 carbon atoms, preferably 4 to 5 carbon atoms, preferably isobutylene, or 2-methyl-butene-1, and 0.5 to 15.0% of a multiolefin of 4 to 15 carbon atoms, e.g. butadiene, myrcene, etc., but preferably a conjugated diolefin of 4 to 6 carbon atoms, e.g., butadiene, isoprene, piperylene, 2-methylpentadiene, dimethyl butadiene, cyclopentadiene, etc. One may also use small amounts, e.g. 0.1 to 5%, preferably 0.2 to 1.0% of cross-linking agents such as divinylbenzene, dimethallyl, etc., and one may also add minor amounts such as 1 to 5 or 10% of monovinyl aromatic compounds, e.g., styrene, vinyl toluene, vinyl naphthalene, parachlorostyrene, and the like.

These copolymers are made, as described more fully in the references given hereinabove, by copolymerization at low temperature, preferably below −50° C., e.g. −80, −100, or even −165° C., preferably in the presence of an inert diluent such as the lower alkyl halides, e.g. methyl or ethyl chloride, or inert hydrocarbons of about 2 to 10 carbon atoms, preferably butane to octane, by means of a dissolved Friedel-Crafts catalyst, e.g. $AlCl_3$, $TiCl_4$, $ZrCl_4$, $BF_3$, $AlBr_3$, etc., dissolved in a lower alkyl halide, e.g. methyl or ethyl chloride, etc. The preferred types of butyl rubber to be used are the commercially available isobutylene-isoprene butyl rubbers having a mole percent unsaturation of about 0.5 to 3.0, and having Staudinger molecular weights of about 50,000 to 90,000, or Mooney viscosity values (8 minutes at 212° F.) of about 50 to 90.

The sulfur-containing curative system to be used can be any of those known to the art, but preferably using about 0.5 to 5.0 phr. (parts per hundred of rubber) of elemental sulfur, and about 0.1 to 5.0, preferably 0.2 to 2.0 phr. of various known vulcanization accelerators, preferably of the ultra accelerator type such as the various dithiocarbamates, thiuram disulfides, and thiazyl disulfides. Specific accelerators which are suitable include the following:

| Accelerators | Chemical name | Type |
|---|---|---|
| Altax | Benzothiazyl disulfide | Secondary. |
| Captax | Mercaptobenzothiazyl disulfide | Do. |
| Cumate | Copper diethyl dithiocarbamate | Primary ultra. |
| Selenac | Selenium dithiocarbamate | Do. |
| Tetrone A | Di-N-pentamethylene thiuram disulfide. | Do. |
| Tellurac | Tellurium diethyl dithiocarbamate | Do. |
| Tuads | Tetramethyl thiuram disulfide | Primary. |
| Zimate | Zinc dimethyl dithiocarbamate | Primary ultra. |

In place of the sulfur-containing accelerators, other types may be used, such as Polyac (which is paradinitroso benzene), GMF (paraquinone dioxime), or various esters and other derivatives thereof, supplemented when necessary with oxidizing agents such as red lead ($PB_3O_4$), etc.

If desired, supplemental curatives or promoters may be used such as aromatic nitroso compounds having the general formula Y—Ar—NO, where Ar is an aromatic nucleus, and Y is a functional substituent other than nitroso, such as N-methyl-N-4-dinitrosoaniline, e.g. the product available commercially called "Elastopar," or resinuous types of curatives such as those of the dimethylol phenol types, e.g. 4-butyl, 2,6-dimethylol phenol, or corresponding 4-amyl or octyl products, or polymeric condensation products thereof, e.g. one commercially available called Amberol ST-137.

The non-accelerating copper-containing material to be used, according to the primary feature of the present invention, is preferably either elemental copper powder, or an inorganic copper compound such as copper sulfate, nitrate, chloride, etc., or various vulcanization-inert organic copper compounds, i.e., those which are free from vulcanization-accelerating radicals, such as the copper salts of the fatty acids, e.g. acetic, propionic, stearic, oleic, etc., or other copper compounds such as copper naphthenate, etc. The copper compounds may be of either the divalent or monovalent types.

For instance, fillers, e.g. carbon black (channel, furnace, thermal, etc.) or mineral fillers (silica, alumina, clay, whiting, etc.) or various pigments (red, blue, etc.); or plasticizers e.g. mineral oil, esters, etc., or various waxes and other softeners, or various tackifying resins and gums, stabilizers, e.g. anti-oxidants, anti-ozonants, etc.

Although the mechanism of the operation of the present invention is not yet understood with certainty, it is believed that the scorch-preventing copper-containing materials react in some way with the sulfur-containing curatives at the moderately low mixing temperatures, i.e. below 290° F., to prevent or substantially retard the normal vulcanization or accelerating action of the sulfur-containing curatives, and then after the butyl rubber composition has been thoroughly compounded and shaped and finally heated to a vulcanizing temperature and time the sulfur-containing curatives are freed from the interfering effect of the copper-containing materials, and thus have been permitted to carry out a fast and tight cure of the butyl rubber composition.

The present invention applies uniquely to copper as the effective scorch-preventing substance, in elemental or ionic form. Numerous other metals and compounds thereof have been tested and found wholly lacking in the unique scorch preventing property of the copper. For instance, those tried which have not worked as sodium and silver from group I of the periodic table, magnesium, calcium, zinc, cadmium and mercury of group II, aluminum of group III, lead of group IV, and arsenic and bismuth of group V, manganese of group VII, as well as iron and cobalt of group VIII.

This invention cannot be applied to the compounding of natural rubber, or other high unsaturation synthetic rubbers, e.g. having an iodine number of 200 to 400, because copper, even when present in as small amounts as 0.1 or 0.2%, is very harmful to natural rubber, and prevents making satisfactory vulcanizates thereof.

This invention also does not appear to work with sulfur-free curing systems. In other words, copper compounds and copper powder did not substantially increase the Mooney scorch time of a butyl rubber compound using GMF (paraquinone dioxime), red lead and Altax as the curative system. Similar results were obtained with a dibenzo GMF and $PbO_2$ curative system.

To show the importance of copper in the operation of the present invention, it should be noted that stearic acid per se has substantially no scorch preventing properties; nor does zinc stearate; but copper stearate does. Therefore, it is the copper in the copper stearate which is the effective scorch preventing agent.

The details and advantages of the invention will be better understood from a consideration of the following experimental data.

It should be noted, in interpreting the discussion hereinabove and the data herebelow, that the Mooney scorch time (the minutes for a 3-point rise in the Mooney value during compounding) should normally be in the range of about 15 to 23 minutes for most commercial rubber compounding plant operations. In other words, Mooney scorch values less than 15 are undesirably low, and mean that the compounds are scorching so fast that it is difficult to get thorough mixing of all of the compounding ingredients, and proper shaping, without having a scorching or partial vulcanization.

EXAMPLES I AND II

Three tests were made in which a commercial grade of butyl rubber was compounded with carbon black and other conventional compounding ingredients, both with and without a copper-containing material as a scorch retarder. Run 1 was the control, while in run 2, ¼ phr. (parts per hundred of rubber) of powdered copper was added, and in run 3, 1 phr. of copper sulfate was added.

The compounding recipe used in all three runs, and the amounts of copper material used, as well as the Mooney scorch data obtained, and the physical property data obtained on the vulcanizates (after 40 minute cure at 307° F.), are shown in the following table:

Table I

RECIPE

| | Parts (by wt.) |
|---|---|
| Butyl rubber "A" | 100 |
| Kosmobile 66 (MPC black) | 50 |
| Zinc oxide | 5 |
| Elastopar (chem. promoter) | 1.2 |
| Sulfur | 2 |
| Tellurac | 1 |
| Captax | 1 |

| | Control | Ex. I | Ex. II |
|---|---|---|---|
| Run | 1 | 2 | 3 |
| Copper (powdered) | | ¼ | |
| $CuSO_4 \cdot 5H_2O$ | | | 1 |
| Mooney scorch (minutes to 3 pt. rise) | 14' | 18' | 24'' |
| 40' cure at 307° F.: | | | |
| Tensile | 2,600 | 2,610 | 2,510 |
| Elongation | 440 | 470 | 460 |
| Modulus at 300% | 1,660 | 1,590 | 1,530 |

In the above tests butyl rubber "A" was a commercial butyl rubber having a mole percent unsaturation of about 1.7, and having a Mooney value (8 minutes at 212° F.) of about 45.

In carrying out the above tests, the butyl rubber, carbon black, and Elastopar were first compounded together in a Banbury mixer at 290–330° F. for about 8 to 10 minutes, then the zinc oxide was added, then after cooling to about 270° F., the copper powder or copper salt, if used, was mixed into the compound and then finally the curatives (sulfur, Tellurac and Captax) were added and thoroughly mixed.

The Mooney scorch data show that whereas the control run 1 showed a Mooney scorch time of 14 minutes, run 2 in which ¼ phr. of copper powder was used had a Mooney scorch time of 18 minutes, and run 3 in which one part of copper sulfate was used had a very high Mooney scorch time of 24 minutes. The tensile strength and other physical property data in Table I show that the use of copper powder in run 2 and copper sulfate in run 3, though successfully preventing scorching during compounding, did not substantially interfere with the vulcanization, as the tensile strength, elongation and modulus (at 300%) obtained were substantially the same as those obtained in the conrtol run 1.

EXAMPLE III

Another set of runs was made in which a control run 4, not containing any copper material, is compared with run 5 in which copper sulfate was used as scorch retarder, though the runs are not absolutely identical because the Captax used in run 4 was not used in run 5. However, the runs show the tremendous increase in Mooney scorch time obtained in run 5 due chiefly to the use of the copper sulfate. The compounding ingredients used, the Mooney scorch data, and the vulcanizate properties obtained after a 20-minute cure at 330° F. are shown in the following table:

Table II

| Runs | Ex. III | |
|---|---|---|
| | 4 | 5 |
| Butyl rubber "A" | 100 | 100 |
| Kosmobile 66 (MPC black) | 50 | 50 |
| $CuSO_4$ | | 3.1 |
| Zinc oxide | 5 | 5 |
| Elastopar | 1.2 | 1.2 |
| Sulfur | 2 | 2 |
| Tellurac | 1 | 1 |
| Captax | 1 | |
| Mooney scorch (minutes to 3 pt. rise) | 14' | 42' |
| 20' cure at 330° F.: | | |
| Tensile (p.s.i.) | 2,860 | 2,060 |
| Elongation | 440 | 440 |
| Modulus at 300% | 1,780 | 1,110 |

The above data in Table II show in run 5 that the combination of the use of 3.1 phr. of copper sulfate, and the omission of the captax gave an extraordinary increase in Mooney scorch from 14 minutes in run 4 to 42 minutes in run 5. The omission of the Captax from run 5 resulted in some decrease in tensile strength and modulus, although the physical properties of the vulcanizate of run 5 are excellent for a material having such a high Mooney scorch time of 42 minutes.

EXAMPLE IV

Another set of tests is shown herebelow to show that organic copper salts such as copper stearate have scorch preventing properties similar to the copper powder and inorganic copper salts such as copper sulfate. In this set of tests the control run 6 without any copper compound is compared with run 7 which contained 2 phr. of copper stearate.

In this case, although actual Mooney scorch data were not obtained, some samples of each run were subjected to curing for 50 minutes at the very low temperature of 270° F., in order to ascertain the percent cure, based on 300% modulus data, compared to samples vulcanized for 40 minutes at 307° F., as representing 100% cure.

It has also been found that the present invention has an additional advantage of improving the age-resistance of the butyl rubber compounds, and accordingly data are shown here, indicating that the copper stearate used in run 7 gave very substantial age-resistance compared to the control run 6.

The recipe used and the data obtained on percent cure with 50 minutes at 270° F., the physical properties of the vulcanizates after the cure for 40 minutes at 307° F., and corresponding properties after aging 72 hours at 250° F. are shown in the following Table III:

Table III

| | Parts |
|---|---|
| Butyl rubber "A" | 100 |
| Kosmobile 66 (MPC black) | 50 |
| Zinc oxide | 5 |
| Elastopar | 1.2 |
| Sulfur | 2 |
| Tellurac | 1.5 |
| Altax | 1 |

| Run | Ex. IV | |
|---|---|---|
| | 6 | 7 |
| Copper stearate | | 2 |
| Percent cure with 50′ at 270° F. | 78.2 | 55.8 |
| Cure 40′ at 307° F.: | | |
| Tensile | 2,414 | 2,333 |
| Modulus at 300% | 1,865 | 1,615 |
| Elongation | 360 | 385 |
| Aged 72 hrs. at 250° F.: | | |
| Tensile | 1,773 | 2,015 |
| Modulus at 300% | 1,398 | 1,605 |
| Elongation | 365 | 362 |
| Percent retention of physicals after aging: | | |
| Tensile, percent | 73.4 | 86.4 |
| Modulus at 300%, percent | 74.9 | 99.4 |
| Elongation, percent | 101.3 | 100.5 |

The above data in Table III show that the copper stearate (used in run 7) resulted in less scorching tendency than control run 6, as indicated by the fact that when each sample was held for 50 minutes at 270° F., run 7 with the copper stearate only obtained 55% cure whereas run 6 obtained 78% cure, both of these figures being compared to the 300% modulus obtained when the samples were actually cured for 40 minutes at 307° F. (as representing a 100% cure).

In the lower part of the table the data show that after aging 72 hours at 250° F. the tensile strength of run 7 had only reduced from 2333 to 2015, whereas the control run 6 reduced in tensile strength from 2414 down to 1773. Thus, the copper stearate used in run 7 resulted in 86% tensile strength retention after aging, whereas the control run 6 resulted in only 73% tensile retention. The modulus retention in run 7 was even better, i.e., 99%, due to the copper stearate, compared to only 75% in the control run 6 without the copper stearate.

EXAMPLE V

Two runs were made, one a control without copper stearate and the other with copper stearate, using a butyl rubber compounding recipe having a total of 90 parts of carbon black and a strong curative system, in order to show how the invention is of value for compounding and processing relatively stiff compositions which normally have very bad scorching tendencies.

The recipe used, and the data on Mooney scorch time, as well as the data on physical properties of the vulcanizates obtained with 40 minutes at 307° F., are shown in the following Table IV:

Table IV

| | Parts |
|---|---|
| Butyl rubber "A" | 100 |
| Kosmobile 66 (MPC black) | 50 |
| SAF black | 40 |
| Necton 60 | 5 |
| Elastopar | 1.5 |
| Stearic acid | 5 |
| Zinc oxide | 5 |
| Sulfur | 5 |
| Monex (tetramethylthiuram monosulfide) | 2 |
| Altax | 2 |

| Run | Ex. V | |
|---|---|---|
| | 8 | 9 |
| Cu stearate | 0 | 2 |
| Mooney scorch min | 8 | 14 |
| 40′ cure at 307° F.: | | |
| Tensile | 1,560 | 1,580 |
| Elongation | 315 | 335 |
| Modulus at 300% | 780 | 690 |

The above data in Table IV show that the use of copper stearate in run 9 gave relatively a tremendous improvement in the Mooney scorch time from the 8 minutes of the control run 8 to 14 minutes in run 9. This is almost double the scorch time of the control. Yet this great advantage was obtained without any substantial sacrifice in the physical properties of the vulcanizates, which were essentially the same for both runs 8 and 9. The advantage of the present invention as apparent from Example V, can be better appreciated by considering that if it were desired to raise the Mooney scorch time of run 8 from 8 minutes up to about 14 minutes but without using copper stearate of the present invention, about the only other means of accomplishing this would be to reduce the amount of curatives used in the curing recipe. This would, for instance, mean reducing the amount of sulfur from 5 down to 3 or 2, and only use one part each of the Monex and Altax instead of 2 parts of each. However, this would result in a compound which would be slower curing, and would therefore have to be cured probably for at least 60 minutes at 307° F., instead of only 40 minutes as shown in the above table. Thus, the present invention has permitted the curing of this composition at 40 minutes (at 307° F.) but without the scorching difficulties which normally are encountered with a composition which has a Mooney scorch time of only 8 minutes.

It is not intended that this invention be limited to the specific examples which have been given hereinabove for the sake of illustration, but in the appended claims it is intended to claim all modifications coming within the scope and spirit of the invention.

What is claimed is:

1. In the process of preparing a butyl rubber composition, said butyl rubber being a copolymer of 85 to 99.5 wt. percent of a $C_4$ to $C_8$ isoolefin and 15 to 0.5 wt. percent of a $C_4$ to $C_{14}$ multiolefin, wherein said composition contains sulfur-containing curatives in amounts normally tending to cause scorching during compounding and shaping when the sulfur-containing curatives are mixed with the butyl rubber polymer at a temperature of 200° to 280° F. for compounding and shaping, the composition thereafter being cured, the improvement which comprises adding to the composition prior to compounding with sulfur-containing curatives, a scorch-retarding amount of a nonaccelerating copper-containing material selected from the group consisting of copper powder, copper sulfate, copper nitrate, copper chloride, copper salts of fatty acids, and copper naphthenate.

2. An unvulcanized composition which is nonscorching at temperatures below 290° F. comprising a rubbery copolymer of 85 to 99.5 wt. percent of a $C_4$ to $C_8$ isoolefin and 0.5 to 15 wt. percent of a $C_4$ to $C_{14}$ multiolefin, sulfur-containing curatives, and 0.1 to 5 phr. of a non-accelerating copper salt of a fatty acid.

3. The composition of claim 2 wherein said copper salt of a fatty acid is copper stearate.

4. A composition comprising 100 parts by weight of a rubbery copolymer of 85 to 99.5 wt. percent of a $C_4$ to $C_8$ isoolefin and 0.5 to 15 wt. percent of a $C_4$ to $C_{14}$ multiolefin, 0.5 to 5 parts by weight of elemental sulfur, and 0.1 to 5 parts by weight of copper stearate.

5. A composition which is non-scorching at temperatures below 290° F., comprising 100 parts by wt. of butyl rubber copolymer of 85 to 99.5 wt. percent of a $C_4$ to $C_8$ isoolefin and 0.5 to 15 wt. percent of a $C_4$ to $C_{14}$ multiolefin, about 2 to 5 phr. of elemental sulfur, about 0.1 to 5.0 phr. of vulcanization accelerators, and a scorch-retarding amount of at least 2 phr. of copper stearate.

6. In the process of making butyl rubber compositions comprising 100 parts by weight of an isobutylene-isoprene butyl rubber containing about 1 to 5% of combined isoprene and 95 to 99% isobutylene, and comprising about 0.5 to 5.0 phr. of elemental sulfur, and about 0.1 to 5.0 phr. of vulcanization accelerators, the improvement comprising using in said compositions a scorch-retarding amount of about 0.1 to 5 phr. of a scorch-preventing non-accelerating copper-containing material selected from the group consisting of copper powder, copper sulfate, copper nitrate, copper chloride, copper salts of fatty acids, and copper naphthenate.

7. Process according to claim 6 using copper powder.

8. Process according to claim 6 using copper sulfate.

9. Process according to claim 6 using copper stearate.

10. The process which comprises mixing at a temperature of about 200–280° F. butyl rubber copolymer of 85 to 99.5 wt. percent of a $C_4$ to $C_8$ isoolefin and 0.5 to 15 wt. percent of a $C_4$ to $C_{14}$ multiolefin, sulfur-containing curatives, and a scorch-preventing amount of a non-accelerating copper-containing material selected from the group consisting of copper powder, copper sulfate, copper nitrate, copper chloride, copper salts of fatty acids, and copper naphthenate.

11. Process which comprises mixing together at about 200–280° F., 100 parts of butyl rubber, copolymer of 85 to 99.5 wt. percent of a $C_4$ to $C_8$ isoolefin and 0.5 to 15 wt. percent of a $C_4$ to $C_{14}$ multiolefin, a scorch-retarding amount of about 0.1–5.0 phr. of a non-accelerating copper-containing material selected from the group consisting of copper powder, copper sulfate, copper nitrate, copper chloride, copper salts of fatty acids, and copper naphthenate, and about 0.5–5.0 parts of elemental sulfur, and about 0.1–5.0 phr. of vulcanization accelerators, then shaping the composition, and heating it to a vulcanization temperature of at least 290° F. for a vulcanization time.

12. Process according to claim 11 in which the amount of sulfur and accelerators used is sufficient that without said copper-containing scorch preventer the composition would normally tend to scorch during compounding and shaping at temperatures of about 200–280° F., but with said scorch preventer the composition has a Mooney scorch time of about 30% to 200% greater than without it, and yet can be cured at about 300 to 450° F. in about 2 hours to 1 minute.

References Cited in the file of this patent

UNITED STATES PATENTS

| | | |
|---|---|---|
| 2,822,342 | Ford et al. | Feb. 4, 1958 |
| 2,830,970 | Twaney | Apr. 15, 1958 |
| 2,897,164 | Ford et al. | July 28, 1959 |

OTHER REFERENCES

Baron: "Modern Synthetic Rubbers," p. 484 (1949), Chapman and Hall Ltd., London.

Gibbs et al.: "Rubber Journal and International Plastics," April 5, 1958 (British), pages 524–525, vol. 134, No. 14.